(12) United States Patent
Niem et al.

(10) Patent No.: US 8,432,450 B2
(45) Date of Patent: Apr. 30, 2013

(54) SURVEILLANCE SYSTEM HAVING STATUS DETECTION MODULE, METHOD FOR SELF-MONITORING OF AN OBSERVER, AND COMPUTER PROGRAM

(75) Inventors: Wolfgang Niem, Hildesheim (DE); Hartmut Loos, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 303 days.

(21) Appl. No.: 12/677,051

(22) PCT Filed: Sep. 19, 2008

(86) PCT No.: PCT/EP2008/062523
§ 371 (c)(1), (2), (4) Date: Mar. 8, 2010

(87) PCT Pub. No.: WO2009/062775
PCT Pub. Date: May 22, 2009

(65) Prior Publication Data
US 2010/0201821 A1 Aug. 12, 2010

(30) Foreign Application Priority Data
Nov. 16, 2007 (DE) .......................... 10 2007 054 819

(51) Int. Cl.
*H04N 7/18* (2006.01)

(52) U.S. Cl.
USPC ........... 348/159; 348/143; 348/169; 348/158; 348/151; 348/157

(58) Field of Classification Search .................. 348/159, 348/143, 169, 158, 151, 157
See application file for complete search history.

(56) References Cited

U.S. PATENT DOCUMENTS

| | | | | |
|---|---|---|---|---|
| 5,091,780 A | * | 2/1992 | Pomerleau | 348/152 |
| 5,517,236 A | | 5/1996 | Sergeant et al. | |
| 5,867,587 A | * | 2/1999 | Aboutalib et al. | 382/117 |
| 6,070,098 A | | 5/2000 | Moore-Ede et al. | |
| 7,382,244 B1 | * | 6/2008 | Donovan et al. | 340/506 |

FOREIGN PATENT DOCUMENTS

| | | |
|---|---|---|
| DE | 196 42 830 | 4/1998 |
| EP | 0 714 586 | 6/1996 |

* cited by examiner

*Primary Examiner* — Shawn An
(74) *Attorney, Agent, or Firm* — Michael J. Striker

(57) ABSTRACT

A surveillance system (1) for monitoring a plurality of surveillance regions (5) is controllable and/or controlled by at least one human observer (4). The system includes a state detection module (8) which is designed and/or situated such that the surveillance state of the observer (4) may be determined on the basis of optically detected state signals of the observer (4).

15 Claims, 3 Drawing Sheets

SURVEILLANCE SYSTEM HAVING STATUS DETECTION MODULE, METHOD FOR SELF-MONITORING OF AN OBSERVER, AND COMPUTER PROGRAM

CROSS-REFERENCE

The invention described and claimed hereinbelow is also described in PCT/EP2008/0652523, filed on Sep. 19, 2008 and DE 10 2007 054 819.4, filed on Nov. 18, 2007. This German Patent Application, whose subject matter is incorporated here by reference, provides the basis for a claim of priority of invention under 35 U.S.C. 119 (a)-(d).

BACKGROUND OF THE INVENTION

The present invention relates to a surveillance system for monitoring a plurality of surveillance regions, in which the surveillance system is controllable and/or controlled by at least one human observer.

Surveillance systems typically include a plurality of surveillance cameras which are installed in different locations in order to observe one or more surveillance regions. Surveillance systems of this type are used, e.g., to monitor public places, intersections, buildings, libraries, train stations, factories, prisons, retirement homes, etc.

In a typical design of surveillance systems of this type, the surveillance signals of the surveillance cameras are combined at one surveillance center, where they are inspected automatically using suitable surveillance algorithms, or by surveillance personnel. The advantage of automated monitoring is that the quality of surveillance remains consistent, and personnel costs are minimized. In contrast, the advantage of using surveillance personnel is the ability of the human component of the surveillance personnel to recognize suspicious behavior by persons in the surveillance region in cases that are not covered by surveillance algorithms. An example of a typical video surveillance system is disclosed in EP 0 714 586 B1.

SUMMARY OF THE INVENTION

The present invention provides a surveillance system for monitoring a plurality of surveillance regions.

The surveillance system preferably includes a plurality of surveillance sensors which may be designed, in particular, as surveillance cameras, and, as an alternative or in addition thereto, as microphones, light barrier systems, contact switches, scanners, etc. The surveillance regions to be monitored using the surveillance system are designed as three-dimensional surveillance regions, e.g., as rooms, hallways, public places, intersections, etc. Preferably, the surveillance system and/or the surveillance regions and/or at least one surveillance region are/is stationary. The surveillance system is designed for use by surveillance personnel to perform monitoring; the surveillance system is controllable and/or controlled during operation by at least one human observer, in particular a guard.

According to the present invention, it is provided that a state detection module is integrated in the surveillance system, and is designed and/or situated to determine the surveillance state of the observer on the basis of optically detected and/or detectable state signals that stem from or are transmitted by the observer. It is therefore provided that the surveillance state—technically speaking, the operating state—of the observer be ascertained on the basis of an optical sensor during the inspection of the surveillance system. The state detection module therefore functions as self-monitoring of the surveillance system, including the human observer.

By ascertaining or determining the surveillance state of the observer, the quality of surveillance may be greatly improved or stabilized. Firstly, it is possible to record the surveillance state of the observer, thereby making it possible to identify or evaluate gaps in surveillance or similar unusual surveillance states at a later point in time. Secondly, it is possible to use the surveillance state as an actual quantity in a control circuit, and to generate a manipulated variable on the basis of the actual quantity. Thirdly, the present invention makes it possible to use the surveillance state of the observer as an actual quantity in a control loop, and to generate a manipulated value or a manipulated variable on the basis of the actual quantity. Fourthly, the present invention makes it possible to implement a human-machine interface, it being possible to utilize the surveillance state of the observer as an input variable for controlling the surveillance system. These general inventive ideas are made specific by the dependent claims and/or the description that follows, and by the embodiments that are provided.

In a particularly preferred embodiment of the present invention, the surveillance state includes a fatigue level and/or a focus or viewing direction of the observer. The fatigue level is an important indicator of the quality of the surveillance activity performed by the observer. Basically, it is important to detect whether the observer has fallen asleep. However, intermediate stages of the fatigue level also provide valuable information since it is possible, e.g., to detect brief lapses in attentiveness, such as nodding off, etc. The direction in which the observer is focusing his/her attention, in particular the viewing direction of the observer, provide valuable information about the surveillance state of the observer by determining whether the observer is watching monitors, etc., that are connected to the surveillance system, or whether the observer is temporarily distracted, e.g., in the situations "looking out the window", "reading a newspaper", etc.

In a preferred embodiment of the present invention, the state signals are generated passively and/or in a manner that is unbeknownst to and/or uncontrolled by the observer. State signals of this type are, e.g., yawning, blinking, or eyelid behavior in general, eyebrow movements, how the observer is holding his/her head, head poses, eye opening angle, facial muscle contortions, grinning, etc. State signals of this type may be evaluated individually or in entirety by the state detection module, and, based thereon, the surveillance state of the observer may be derived.

In a preferred embodiment of the present invention, the state signals are designed, in particular, as optical facial signals, that is, as signals that are generated by the face and/or head, and/or in the region of the observer's face and/or head. This includes, in particular, facial orientation and position, expression, eye opening angle, viewing direction, mouth opening angle, the shape of the mouth, eye motions, etc.

In a specific design of the present invention, the surveillance system and/or the state detection module includes a human-machine interface—referred to below as HMI—for recording the state signals of the observer, and an evaluation device which evaluates the state signals that were recorded and ascertains the surveillance state of the observer.

The HMI may be designed as any type of optical sensor, although it is preferably realized as a camera which is designed and/or situated to record the observer. In a preferred development of the system, the camera is designed as a mono camera or a stereo camera which records the observer front the front or substantially from the front. From this perspective, the state signals of the observer are best detected optically. In an optional development of the present invention, the surveillance system includes a surveillance center in which the information on the surveillance regions and/or from the surveillance cameras is combined, and which includes a work station for the observer for monitoring the surveillance regions, the camera being design to record the observer at the work station, in particular from the front.

In one possible embodiment of the present invention, the surveillance system includes a warning module which is designed to output a warning signal depending on the surveillance state. Preferably, the surveillance system and/or the state detection module include(s) an output device, using which an optical, acoustic and/or tactile signal may be output, e.g., to the observer, and which is triggered by the warning signal when limit conditions are exceeded, in particular a limit value for the fatigue level.

In an optional development of the present invention, the surveillance system includes an instruction module which is designed to output instructions to the observer on the basis of a specified surveillance strategy. Optionally, the instruction module is designed to monitor compliance with the instructions by evaluating the surveillance state, in particular the focus and/or viewing direction of the observer. The surveillance strategy may be statistically specified, dynamically generated, and/or event-controlled. If statistically specified, the instruction module generates instructions that ensure, e.g., that the observer checks all surveillance regions equally often. If the monitoring activities are specified in a dynamic manner, the surveillance strategy is determined, e.g., as a function of the activities that are detected in the surveillance regions. If the monitoring activities are specified in an event-controlled manner, then, e.g., the observer's attention is directed to a surveillance region in which an event was automatically detected. As an option, it is also possible for the surveillance strategy to be created on the basis of priorities. Compliance with the instructions is checked by evaluating the surveillance state of the observer. For the case in which the observer does not follow the instructions and/or surveillance strategy, countermeasures may be implemented, e.g., reissuing the instructions, or outputting a message to a monitoring function, such as a supervisor.

In a further optional supplementation of the present invention, the surveillance system includes a training module which registers the surveillance state and, in particular, performs a statistical evaluation thereof, and training instructions are generated in order to improve the quality of surveillance. For example, the training module may perform a statistical evaluation to determine which surveillance regions are monitored very frequently and which surveillance regions are monitored very infrequently, and provide related training instructions to the observer in the form of a message. Using the training module, the surveillance activity of the observer may be directed toward a desired optimum, while the progress made by the observer is recorded in a traceable manner.

In an optional development of the present invention, the surveillance system includes a recording module which is designed to store the surveillance state or a graph of the surveillance state over time together with the signal stream from the surveillance system. In particular, the fatigue and/or viewing direction parameters are recorded in a metadata stream together with the signal data from the surveillance regions, in particular the video data from the surveillance regions. The main advantage of the recording module is that, by recording the viewing direction and/or fatigue level of the observer, it is possible to subsequently determine what the observer actually saw or could have seen. It is also possible to store the results of the training module and/or the instruction module and/or additional data for purposes of quality assurance of the surveillance.

In a possible expansion of the present invention, the surveillance system includes a selection module which identifies and/or selects a surveillance target, which has been fixed upon the observer, on the basis of the observer's surveillance state. In this embodiment, the surveillance state of the observer is ascertained, and the current surveillance target which has been fixed upon by the observer is determined. The surveillance target is preferably designed as a surveillance monitor and/or a section of a surveillance monitor, in which a plurality of surveillance regions is depicted, and/or as a surveillance object in one of the surveillance regions. This surveillance target information may also be recorded by the recording module.

On the basis of the surveillance target information, it is possible, via an optional control module, to track the selected surveillance object by activating and/or actuating surveillance sensors in the surveillance region. For instance, the surveillance sensors may be designed as movable cameras, in particular as PTZ (pan-tilt-zoom) cameras, which automatically track the selected surveillance object via the control module, and/or which are automatically activated. Via the combination of the selection module and the control module, an intuitive human-machine interface is thereby formed, which makes it possible to track an object without manual actuation of the surveillance system.

In an optional supplementation of the present invention, the selected surveillance object is tracked using digital image processing, in which the tracked surveillance object is preferably marked for the observer in the display of the current surveillance region and/or in subsequent surveillance regions. In a possible embodiment, the selected surveillance object(s) is/are stored, and, if it/they subsequently reappear in the same surveillance region or in other surveillance regions, it is specially marked, and/or related information is output to the observer.

In a subsequent development of the present invention, the surveillance system includes an instruction module which is designed to output additional information about the selected surveillance object. The additional information may be, e.g., past movement patterns, interaction with other objects, previously triggered events, recognition of a face, classification of an object, etc. In this manner, the observer may see all available information about the selected surveillance object "at a glance".

In a preferred embodiment, the surveillance system therefore includes a camera-based detection unit that detects the fatigue state and viewing direction of the observer who is viewing a video screen or monitor. The data that are collected may be converted directly into instructions for the observer, and/or they may be recorded together with the video data. The main advantages of the device are the improved quality of surveillance, which results from the fact that fatigue is detected in a timely manner and the observer's focus is better controlled, the fact that movable cameras may be controlled in an intuitive manner, and via improved recreation of surveillance situations in a subsequent evaluation.

A further subject of the present invention relates to a method for the self-monitoring of an observer, having the features of claim 15, in which the observer monitors a plurality of surveillance regions using a surveillance system, preferably of the type described above, and/or as described in one of the preceding claims, and in which optical state signals of the observer are recorded, and the surveillance state of the observer is ascertained on the basis of the state signals. In particular, the method is designed to operate the above-described surveillance system in the intended manner.

A further subject matter relates to a computer program having the features of claim 16.

BRIEF DESCRIPTION OF THE DRAWINGS

Further features, advantages, and effects result from the following description of a preferred embodiment of the present invention.

DETAILED DESCRIPTION OF THE PREFERRED EMBODIMENTS

Figure 1:
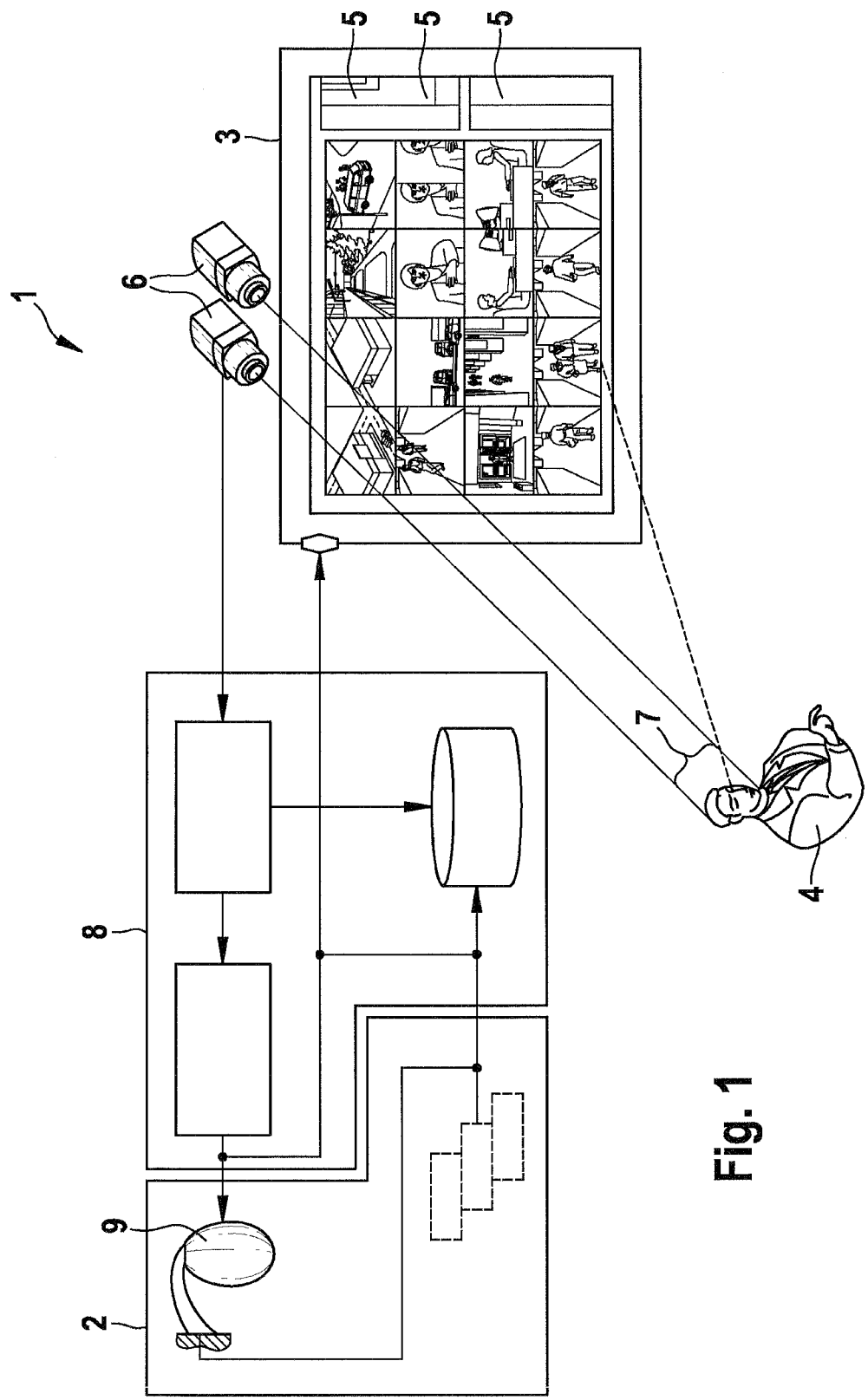
FIG. 1 shows a basic system design of a surveillance system that includes a state detection module, as a first embodiment of the present invention.

FIG. 1 shows a surveillance system 1 which includes a plurality of surveillance cameras 2 that are directed to relevant surveillance regions, e.g., in a building, a factory, a street, etc.

The streams of image data from surveillance cameras 2 are directed—optionally including the use of digital image processing algorithms—to one or more monitors 3, and are depicted thereon. An observer 4 has a work station from which he/she may observe surveillance regions 5 which are depicted on monitor 3. If unusual or noteworthy events take place in surveillance regions 5, observer 4 takes countermeasures or warning measures.

For the self-monitoring of observer 1, surveillance system 1 includes a mono camera or stereo camera 6 that is directed toward observer 4 or his/her work station in such a manner that his/her face 7 lies in the detection region of camera 6 when observer 4 observes monitor 3 and/or surveillance scenes 5.

The streams of image data recorded by camera 6 are transmitted to a state monitoring module 8 which is designed to ascertain the fatigue state of observer 4 and/or his/her viewing direction, and—stated more generally—his/her surveillance state on the basis of optical state signals of observer 4, which are recorded by camera 6. As indicated in FIG. 1, the surveillance state of observer 4 that is ascertained is stored together with the video data streams from surveillance camera 2 in the form of a metadata stream, thereby making it possible to ascertain, at a later point in time, the surveillance state of observer 4 at certain times during surveillance. As an alternative or in addition thereto, the viewing direction of observer 4 is evaluated in such a manner that a surveillance object that has been fixed upon by observer 4 is identified in the surveillance regions, and controllable PTZ camera 9 (pan-tilt-zoom camera) is triggered by state detection module 8 in such a manner that it automatically tracks the surveillance object that was identified.

Figure 2:
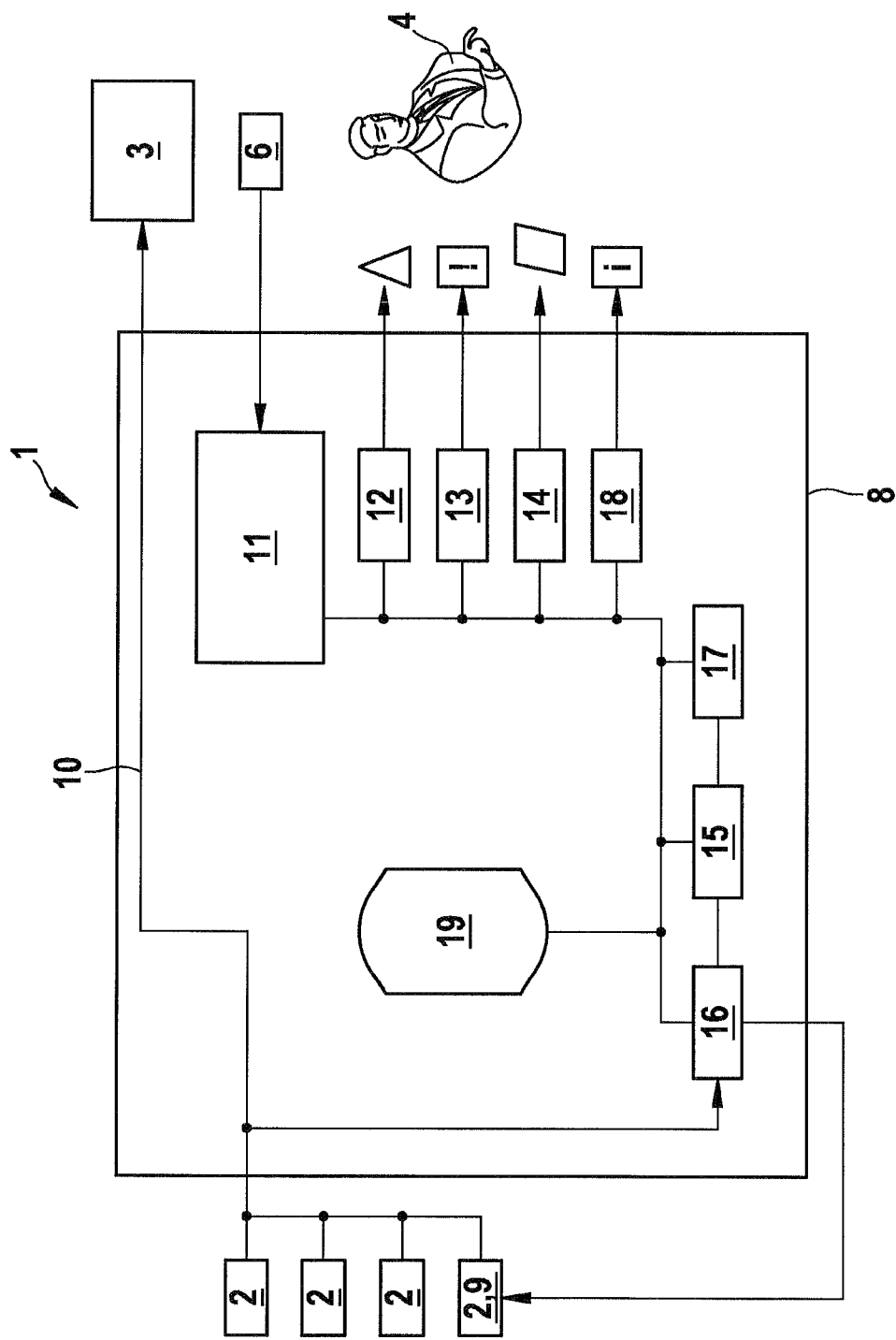
FIG. 2 shows a block diagram which illustrates the mode of operation of the device depicted in FIG. 1.

FIG. 2 shows a block diagram of surveillance system 1 which includes optional additions, in order to better illustrate its mode of operation. Surveillance system 1 is connected to a plurality of surveillance cameras 2, 9, the image data streams of which are directed via a path 10 to one or more monitors 3 in order to display them. FIG. 2 shows a schematic depiction of an observer 4 who is positioned in front of monitors 3, is inspecting monitors 3 and, therefore, surveillance regions 5 that are depicted, and is self-monitored via camera 6.

The optical state signals of observer 4 that are recorded via camera 6 are transmitted to an evaluation device 11 which determines the surveillance state of observer 4, in particular a fatigue level and/or focus and/or viewing direction of observer 4. The fatigue level of observer 4 is detected, e.g., via a camera-based evaluation of eyelid position. The viewing direction may be detected, e.g., by detecting and/or locating the head and/or eyes of observer 4, and/or by performing a model-based calculation of the head pose and/or viewing direction.

In a warning module 12, which is connected to evaluation device 11 in terms of information technology, the fatigue level in particular of observer 4 is compared to specified limit values, and, if limit conditions are exceeded, a warning signal is output to observer 4.

Surveillance system 1 also includes an instruction module 13 that notifies observer 4 during operation which monitor region or which monitors 3 observer 4 should observe. In this manner, it is possible, within the scope of a surveillance strategy, to assign higher and lower priorities to monitors 3 or monitor regions, thereby ensuring that monitors 3 or monitor regions are monitored more or less frequently depending on the priorities. As an alternative, the attention of observer 4 may be directed by instruction module 13 to a monitor 3 or monitor region depicting a surveillance region in which an event was detected using an automated procedure. Preferably, instruction module 13 is designed such that it checks, on the basis of the viewing direction of observer 4 that was determined, whether the instructions were followed, that is, whether observer 4 has actually checked a monitor region or monitor 3 named in the instructions.

As a further optional module, surveillance system 1 includes a training module 14 that observes and evaluates the surveillance state of observer 4 over time. On the basis of long-term analysis of the surveillance activity of observer 4, general suggestions for improvement, in particular, for observer 4 are formulated and output. Suggestions for improvement of this type may relate to the improvement of the surveillance strategy in particular, e.g., observer 4 may be notified that he/she has neglected certain monitors 3 or monitor regions.

In a selection module 15, it is determined based on the viewing direction that is determined, which monitor 3 or monitor region, and/or which surveillance object has been fixed upon by observer 4, and is therefore being intensively or actively observed. The surveillance object that has been fixed upon is stored as a selected surveillance object, and it may be processed further, in an information-related manner, in the subsequent modules.

A selected surveillance object is possibly processed further, e.g., in a control module 16 which is designed to trigger movable surveillance camera 9. Surveillance camera 9 or cameras are triggered by control module 16 in such a manner that the selected surveillance object is tracked by surveillance camera 9, e.g., such that the selected surveillance object is always located in the center of the detection region of surveillance camera 9, and/or is displayed on monitor 3 in a predefined size.

In addition to the actual visual tracking of the selected surveillance object, it is possible to track it digitally in a tracking module 17. This digital tracking is preferably implemented using digital image processing, and uses known object-tracking algorithms. Via digital tracking, it is possible to ascertain and/or display the line of action of the selected surveillance object in the surveillance regions, to specially mark the selected surveillance object in monitor 3, to track it over a plurality of surveillance regions, in particular with it being marked, or to ascertain interactions with other objects.

As a possible supplementation, an information module 18 is provided that outputs additional information about the selected surveillance object, it being possible, e.g., to likewise output the additional information on monitor 3. The additional information may be object classifications, information from previous observations, etc.

The image data streams from surveillance cameras 2, 9 may be stored—in a time—synchronized manner in particular—in a data memory 19 with any selection of data that were generated in modules 11 through 17, so that the surveillance activity of observer 4 may be recreated at a later point in time.

Figure 3:
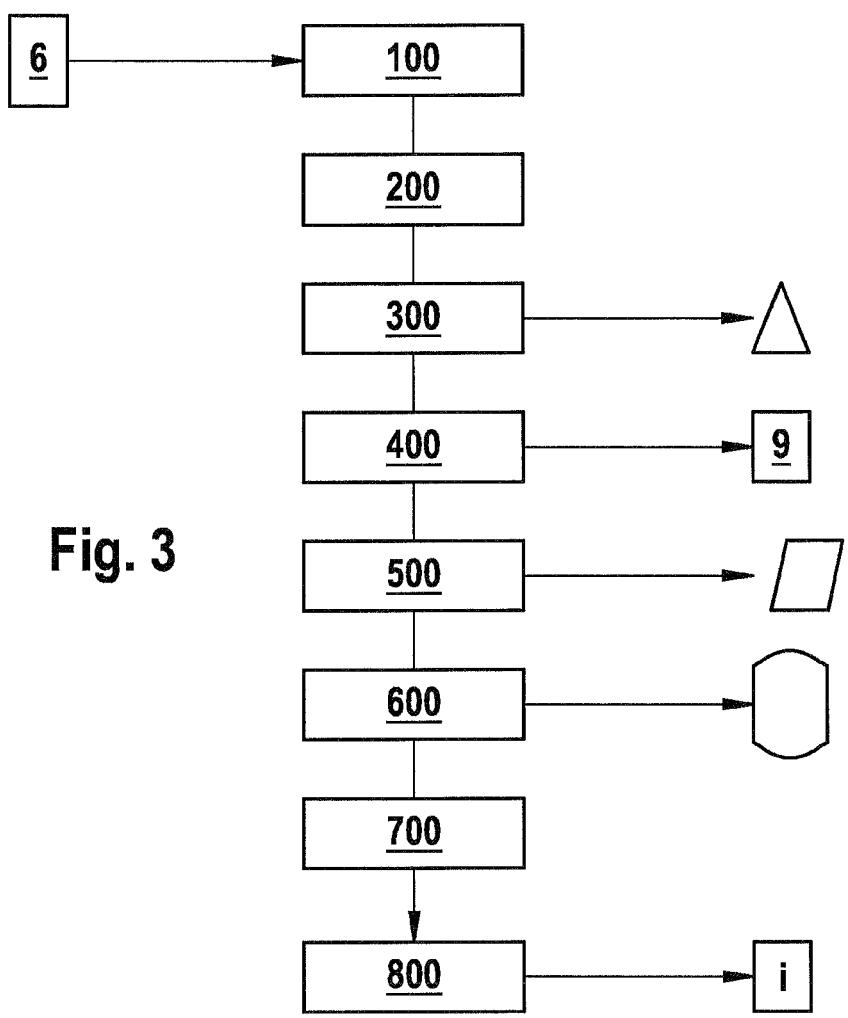
FIG. 3 shows a schematic flow chart which illustrates a possible sequence of steps involved in the method according to the present invention.

FIG. 3 shows, in a schematic depiction, a flow chart which illustrates the method according to the present invention in the form of an embodiment, in which the method is implemented, e.g., in the surveillance system shown in FIG. 2.

In a first step 100, a frontal view of observer 4 is recorded using camera 6. In a second step 200, the fatigue state of observer 4 and his/her viewing direction are ascertained via the video recordings taken by camera 6, in which case the following actions are preferably carried out: detection and location of the head of the observer, detection and location of the eyes of the observer, and a model-based calculation of the observer's eyelids. In a third step 300, if a fatigue level is exceeded, or if the ACTUAL behavior deviates from a SETPOINT behavior in terms of the surveillance state of observer 4, a warning or instruction is output to observer 4 or to another entity. In a fourth step 400, via evaluation of the viewing direction, monitor 3 or a surveillance object that is being observed is selected, and movable surveillance camera 9 may be triggered. In a fifth step 500, instructions for improving the surveillance strategy are generated by performing a long-term evaluation of the surveillance state of the observer. In a sixth step 600, the fatigue parameters and/or viewing direction parameters in the metadata stream are stored together with the video data in data memory 19. In a seventh step 700, surveillance objects that were previously selected are specially marked in the depiction in monitor 3 if they reappear in other surveillance regions or are detected by other surveillance cameras 2. In an eighth step 800, information on surveillance objects that are fixed upon is searched for and displayed.

What is claimed is:

1. A surveillance system (1) for monitoring a plurality of surveillance regions (5), in which the surveillance system (1) is controllable and/or controlled by at least one human observer (4), comprising:
   a state detection module (8) which is designed and/or situated such that the surveillance state of the observer (4) may be determined on the basis of optically detected state signals of the observer (4); and
   an instruction module (13) which is designed to guide the observer (4), via instructions, in the implementation of a specified and/or specifiable surveillance strategy, and to monitor compliance with the instructions via an evaluation of the surveillance state.

2. The surveillance system as recited in claim 1, wherein the surveillance state includes a fatigue level and/or a focus or viewing direction of the observer.

3. The surveillance system (1) as recited in claim 1, wherein the state signals are designed as signals that are generated passively and/or in a manner that is unbeknownst to and/or uncontrolled by the observer (4).

4. The surveillance system (1) as recited in claim 1, wherein the state signals are designed as facial signals and/or head signals.

5. The surveillance system (1) as recited in claim 1, further comprising a human-machine interface (HMI, 6) for recording the state signals of the observer (4), and which includes an evaluation device (11) for evaluating the state signals that were recorded, the result of the evaluation being the surveillance state of the observer (4).

6. The surveillance system (1) as recited in claim 5, wherein the human-machine interface (HMI) is designed as a camera (6) which is designed and/or situated to record the observer (4).

7. The surveillance system (1) as recited in claim 1, further comprising warning module (12) which is designed to output a warning signal depending on the surveillance state.

8. The surveillance system (1) as recited in claim 1, further comprising a training module (14) which evaluates the surveillance state and generates training instructions in order to improve the quality of surveillance.

9. The surveillance system (1) as recited in claim 1, further comprising a recording module (18) which is designed to store the surveillance state together with the signal stream from the surveillance system (1).

10. A surveillance system (1) for monitoring a plurality of surveillance regions (5), in which the surveillance system (1) is controllable and/or controlled by at least one human observer (4), comprising:
    a state detection module (8) which is designed and/or situated such that the surveillance state of the observer (4) may be determined on the basis of optically detected state signals of the observer (4); and
    a selection module (15) which is designed to identify, on the basis of the surveillance state a surveillance monitor (3) and/or a surveillance object located in the surveillance region (5) as the selected surveillance object.

11. The surveillance system (1) as recited in claim 10, further comprising a control module (16) which is designed to track the selected surveillance object by selecting and/or actuating and/or controlling surveillance sensors (9) in the surveillance regions (5).

12. The surveillance system (1) as recited in claim 10, further comprising a tracking module (17) which is designed to mark and/or track the selected surveillance object using digital image processing.

13. The surveillance system (1) as recited in claim 10, further comprising by an instruction module (18) which is designed to output additional information about the selected surveillance object.

14. A method for the self-monitoring of an observer who monitors a plurality of surveillance regions using a surveillance system,
    wherein optical state signals of the observer are recorded, and the surveillance state of the observer is determined on the basis of the state signals, wherein an instruction module (13) is provided which is designed to guide the observer (4), via instructions, in the implementation of a specified and/or specifiable surveillance strategy, and to monitor compliance with the instructions via an evaluation of the surveillance state.

15. A non-transitory computer-readable medium storing a computer program, which when executed by a surveillance system, causes the commuter to carry out all steps of the method as recited in claim 14.

* * * * *